US012711867B2

(12) United States Patent
Hendrickson et al.

(10) Patent No.: US 12,711,867 B2
(45) Date of Patent: Aug. 18, 2026

(54) CARAVAN ROUTE FEEDBACK AND CONTROL SYSTEM

(71) Applicant: Ford Global Technologies, LLC, Dearborn, MI (US)

(72) Inventors: Anna Frances Hardig Hendrickson, Southfield, MI (US); Keith Weston, Canton, MI (US); Brendan F. Diamond, Grosse Pointe, MI (US); Stuart C. Salter, White Lake, MI (US); Kenneth Patrick McHugh, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 155 days.

(21) Appl. No.: 18/512,288

(22) Filed: Nov. 17, 2023

(65) Prior Publication Data

US 2025/0166511 A1 May 22, 2025

(51) Int. Cl.
*G08G 1/00* (2006.01)
*B60W 60/00* (2020.01)

(52) U.S. Cl.
CPC ........... *G08G 1/22* (2013.01); *B60W 60/0025* (2020.02); *B60W 2554/00* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 10,073,464 B2 | 9/2018 | Pilkington | |
| 11,422,571 B2 | 8/2022 | Rao et al. | |
| 2014/0302774 A1 | 10/2014 | Burke et al. | |
| 2016/0003621 A1 | 1/2016 | Koenig et al. | |
| 2017/0123628 A1* | 5/2017 | Lin | G06F 3/167 |
| 2018/0047293 A1* | 2/2018 | Dudar | G05D 1/0257 |
| 2018/0188746 A1* | 7/2018 | Lesher | G05D 1/0217 |
| 2019/0250639 A1 | 8/2019 | Xu et al. | |
| 2020/0019187 A1* | 1/2020 | Wu | G08G 1/096725 |
| 2020/0057453 A1 | 2/2020 | Laws et al. | |
| 2020/0074862 A1* | 3/2020 | Johnston | G08G 1/22 |
| 2021/0255621 A1 | 8/2021 | James | |
| 2022/0129009 A1* | 4/2022 | Park | B60W 10/18 |

(Continued)

FOREIGN PATENT DOCUMENTS

| | | | |
|---|---|---|---|
| DE | 102019204783 A1 * | 10/2020 | G08G 1/22 |
| WO | WO-2017164792 A1 * | 9/2017 | B60W 30/165 |

*Primary Examiner* — Fadey S. Jabr
*Assistant Examiner* — Mario C Gonzalez
(74) *Attorney, Agent, or Firm* — Joseph Zane; Brooks Kushman P.C.

(57) ABSTRACT

A caravan is performed of a plurality of vehicles by an ego vehicle. An ego vehicle receives, in caravan messages via a wireless transceiver of the ego vehicle, capability information indicative of capabilities of the vehicles to traverse an obstacle along a route. Performance rankings that indicate relative capabilities of the vehicles per type of obstacle are determined based on the capability information. One or more ordering strategies are utilized to define a vehicle ordering for traversal of the obstacle along the route, the vehicle ordering being based on the performance rankings of the vehicles and the obstacle. The obstacle is traversed, by the caravan, according to the vehicle ordering.

21 Claims, 5 Drawing Sheets

(56) References Cited

U.S. PATENT DOCUMENTS

| | | | | |
|---|---|---|---|---|
| 2022/0348223 | A1* | 11/2022 | Zhao ..................... | B60W 40/02 |
| 2023/0177840 | A1 | 6/2023 | Telpaz et al. | |
| 2025/0091570 | A1* | 3/2025 | Panthri .................. | G08G 1/166 |

* cited by examiner

CARAVAN ROUTE FEEDBACK AND CONTROL SYSTEM

TECHNICAL FIELD

Aspects of the disclosure generally relate to a vehicle route feedback and control system for vehicle caravans.

BACKGROUND

Vehicle-to-vehicle (V2V) communication refers to the wireless transmission of data between motor vehicles. V2V communications may be used for various purposes, including allowing vehicles to send messages to one another including status information regarding the operation of the vehicle. This information may include, for example, speed, location, direction of travel, braking, and stability data.

SUMMARY

In one or more illustrative examples, an ego vehicle of a caravan of a plurality of vehicles, includes a wireless transceiver, sensors, and one or more controllers. The one or more controllers are configured to receive, in caravan messages via the wireless transceiver, capability information indicative of capabilities of the vehicles to traverse an obstacle along a route, determine performance rankings indicative of relative capabilities of the vehicles per type of obstacle based on the capability information, utilize one or more ordering strategies to define a vehicle ordering for traversal of the obstacle along the route, the vehicle ordering being based on the performance rankings of the vehicles and the obstacle, and traverse the obstacle, by the caravan, according to the vehicle ordering.

In one or more illustrative examples, a method for performing a caravan of a plurality of vehicles by an ego vehicle is provided. An ego vehicle receives, in caravan messages via a wireless transceiver of the ego vehicle, capability information indicative of capabilities of the vehicles to traverse an obstacle along a route. Performance rankings that indicate relative capabilities of the vehicles per type of obstacle are determined based on the capability information. One or more ordering strategies are utilized to define a vehicle ordering for traversal of the obstacle along the route, the vehicle ordering being based on the performance rankings of the vehicles and the obstacle. The obstacle is traversed, by the caravan, according to the vehicle ordering.

In one or more illustrative examples, a non-transitory computer readable medium comprising instructions that, when executed by one or more controllers of an ego vehicle of a caravan of vehicles, cause the ego vehicle to perform operations including to receive, in caravan messages via a wireless transceiver of the ego vehicle, capability information indicative of capabilities of the vehicles to traverse a first obstacle along a route; determine performance rankings indicative of relative capabilities of the vehicles per type of obstacle based on the capability information; utilize one or more ordering strategies to define a first vehicle ordering for traversal of the first obstacle along the route, the first vehicle ordering being based on the performance rankings of the vehicles and the first obstacle; traverse the first obstacle, by the caravan, according to the first vehicle ordering; utilize the one or more ordering strategies to define a second vehicle ordering for traversal of a second obstacle along the route, the second vehicle ordering being based on the performance rankings of the vehicles and the second obstacle, wherein the second obstacle is of a different type than the first obstacle, and the second vehicle ordering differs from that of the first vehicle ordering; and traverse the second obstacle, by the caravan, according to the second vehicle ordering.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A route may refer to a way or course taken by a vehicle from an origin location to a destination location. A caravan may refer to a group or company of travelers who travel together along the same route. It may be desirable for a caravan of vehicles to traverse the same route. In such a case, it may be unclear how to order the vehicles of the caravan, or what settings to apply to each vehicle. In cases where the route is along an off-road path, sensed data about the traversal captured by lead vehicles may be especially useful for following vehicles.

A vehicle route feedback and control system may utilize vehicle telemetry and relative performance specifications of a plurality of vehicles to determine a vehicle order for navigation of the vehicles of the caravan alone a route. The system may also provide recommendations or modifications to following vehicles to enhance their travel along the route, based on the actual performance along the route by the lead vehicle and/or other vehicles ahead of the following vehicle.

Figure 1:
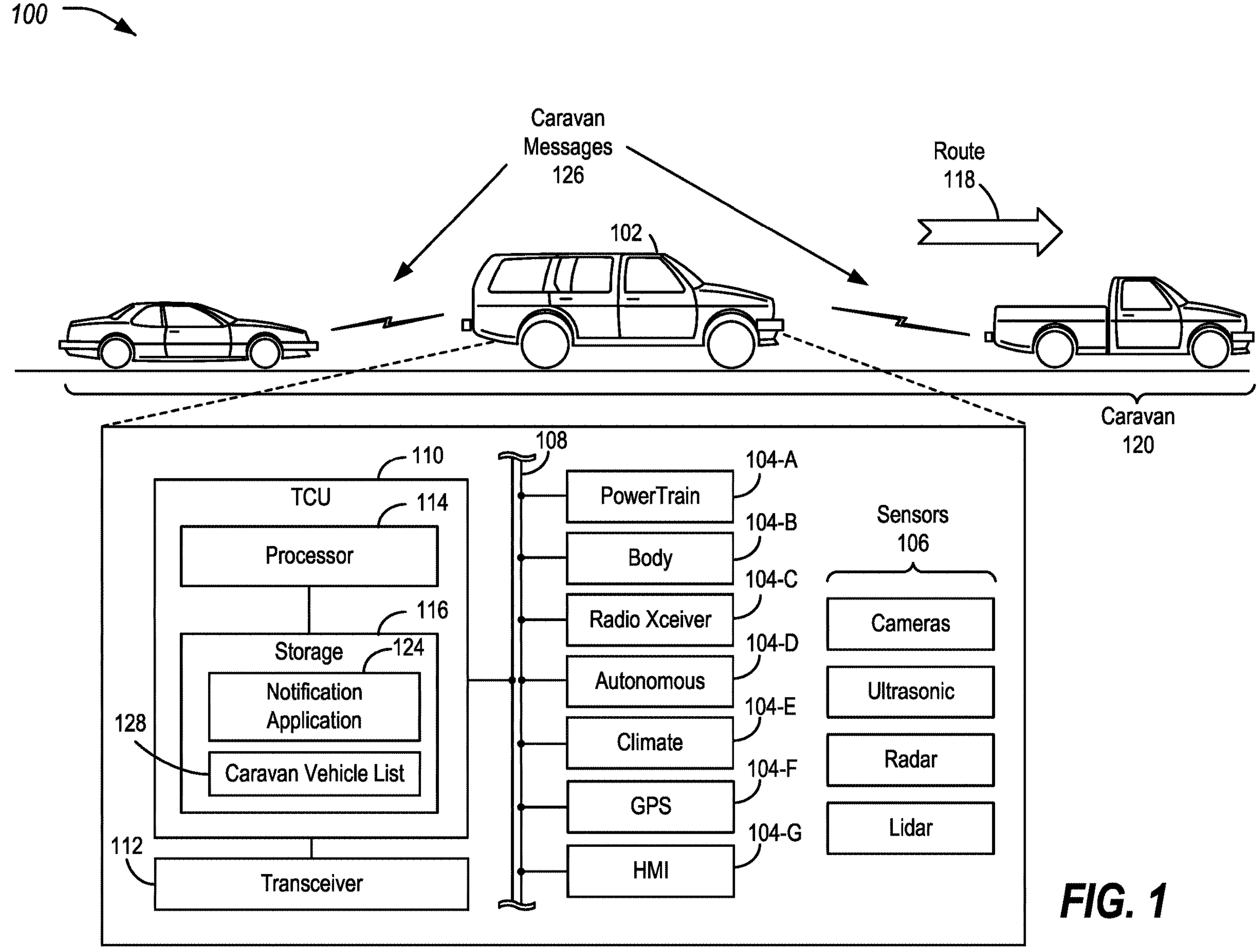
FIG. 1 illustrates an example vehicle route feedback and control system, in accordance with one or more embodiments of the disclosure.

FIG. 1 illustrates an example vehicle route feedback and control system 100, in accordance with one or more embodiments of the disclosure. As illustrated, the vehicle 102 includes a plurality of vehicle controllers 104 and sensors 106 in communication over one or more vehicle buses 108. The vehicle 102 further includes a telematics control unit (TCU) 110 making use of a wireless transceiver 112. The TCU 110 may include a processor 114 and a storage 116. The vehicle 102 may traverse a route 118 in combination with other vehicles 102 of a caravan 120. When executed by the TCU 110, a notification application 124 may be configured to send caravan messages 126 to other vehicles 102 of the caravan 120 and to receive caravan messages 126 from the other vehicles 102 of the caravan 120. The notification application 124 may maintain a caravan vehicle list 128 of identifiers of other vehicles 102 traversing the route 118 of the caravan 120 along with the vehicle 102. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received vehicle-to-everything (V2X) data. The level of automation may vary between different levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), e.g., as defined by International Organization for Standardization (ISO) 3779 and ISO 4030. It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global navigation satellite system (GNSS) controller 104F may be configured to provide vehicle location information; and a human machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver assistance system (ADAS) cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. While a single vehicle bus 108 is illustrated, it should be noted that in many examples, multiple vehicle buses 108 are included, with a subset of the controllers 104 connected to each vehicle bus 108.

The TCU 110 may include network hardware configured to facilitate communication between the vehicle controllers 104 and with other devices of the system 100. For example, the TCU 110 may include or otherwise access a wireless transceiver 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different wireless, peer-to-peer, and/or cellular technologies may be used for vehicle-to-vehicle communication. As some other examples, BLUETOOTH and/or Wi-Fi communication may be performed between the vehicles 102.

The TCU 110 may further include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor (s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

A route 118 may refer to a way or course taken by a vehicle 102 from an origin location to a destination location.

A caravan 120 may refer to a group or company of travelers who travel together along the same route 118.

The TCU 110 may be configured to transmit caravan messages 126 for receipt by other vehicles 102 of the caravan 120. This information may include information indicative of the capabilities of the vehicle 102, such as model year, brand, model, trim, aftermarket parts for each vehicle 102, and specification such as maximum water depth, maximum suspension travel, etc. This information may be provided such that each vehicle 102 is aware of the relative limits of one another.

The caravan messages 126 may also include information about the operation of the vehicles 102. This information may include data related to vehicle telemetry as the vehicle 102 traverses the route 118 of the caravan 120. The TCU 110 may be configured to facilitate the collection of data from the sensors 106 of the vehicle 102 and/or other vehicle information from the vehicle controllers 104 connected to the one or more vehicle buses 108.

In an example, the caravan messages 126 may include information indicative of size thresholds of terrain that is being traversed by the vehicle 102. The size thresholds may be measured, for example, using Radar, Lidar, and/or camera sensors 106 of the vehicle 102. This information may be included in caravan messages 126 for receipt by other vehicles 102 in follow, e.g., to provide requirements to take a certain path and/or to inform the receiving vehicle 102 to restrict its path based on size of the receiving vehicle 102.

As some other examples, the caravan messages 126 may include information such as wheel slip, yaw rate, yaw rate error, lateral change in speed, horizontal change in speed, vertical change in speed, presence of jerk movements in the vehicle 102 travel.

In another example, the caravan messages 126 may include estimated surface u (Mu). This may be determined, for example, based on measured wheel torque vs. torque applied by the powertrain controller 104A. In yet another example, the caravan messages 126 may include audio data such as picked up via a microphone sensor 106. This information may be used to determine sounds consistent with the contact of the undercarriage or chassis of the vehicle 102 with terrain, presence of water flow, etc. In yet another example the caravan messages 126 may include information indicative of whether one or more wheels of the vehicles 102 have left the ground during travel.

In still another example, the caravan messages 126 may include water level and/or wading depth information. For instance, as the vehicle 102 crosses water, B-pillar sensors 106 such as cameras, Radar, LiDar, etc. in combination with image recognition techniques, e.g., of known objects such as other vehicles 102 in the water may be used to estimate a water depth.

The TCU 110 may also be configured to receive caravan messages 126 from other vehicles 102 of the caravan 120. This information may be utilized to compile trail characteristics and help establish speed thresholds and/or recommendations regarding desired maximum vehicle 102 performance vs the current vehicle 102 performance. In an example, received size thresholds may be used by the e.g., to provide requirements to take a certain path and can restrict certain path or passes based on size or maneuverability of the vehicle 102.

The management of sending and receiving of connected vehicle data may be handled by the notification application 124. The notification application 124 may further cause the TCU 110 to maintain a caravan vehicle list 128. The caravan vehicle list 128 may include identifying information for the other vehicles 102 that are traversing the route 118 along with the vehicle 102. In an example the caravan vehicle list 128 may include VINs, media access control (MAC) addresses and/or other identifiers of vehicles 102 in the caravan 120 that, e.g., are traversing the route 118 with the ego vehicle 102.

While not shown, in some examples traffic participants may additionally involve communication via one or more roadside units (RSUs). The RSU may be a device with processing capabilities and networking capabilities and may be designed to be placed in proximity of a roadway for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway or in a specific area. The RSU may also have wired or wireless backhaul capability to allow for communication with other elements of a traffic control system, via e.g., Ethernet, or cellular connection to the cellular network infrastructure, for example over Uu interface.

Figure 2:
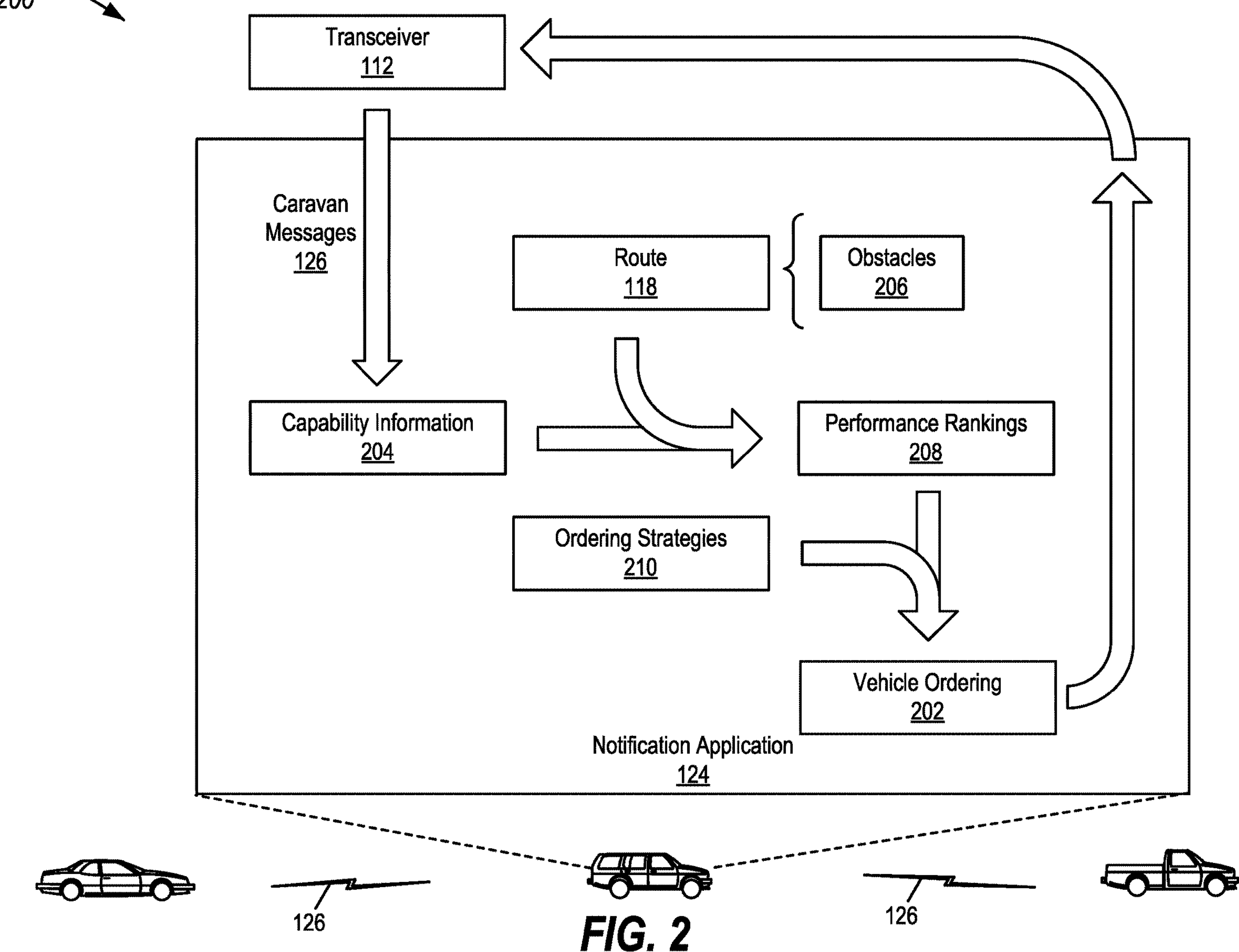
FIG. 2 illustrates an example data flow for the determination of a vehicle ordering of the vehicles of the caravan.

FIG. 2 illustrates an example data flow 200 for the determination of a vehicle ordering 202 of the vehicles 102 of the caravan 120. It should be noted that the data flow 200 is provided in the context of an ego vehicle 102 of the caravan 120, where the other vehicles 102 may be referred to as remote vehicles 102. In some cases, the operations of the data flow 200 may be performed by a managing vehicle 102 of the caravan 120, where the results are communicated to the other vehicles 102, e.g., via the caravan messages 126. In other examples, the operations of the data flow 200 may be performed by multiple or all of the vehicles 102, and/or by road infrastructure or a cloud server having access to the relevant information.

The vehicle ordering 202 may specify the order of the that the vehicles 102 on the caravan vehicle list 128 are to proceed along the route 118. The vehicle ordering 202 may be determined based on capability information 204 of the vehicles 102, obstacles 206 along the route 118, performance rankings 208 of the vehicles 102, and one or more ordering strategies 210.

As shown, the notification application 124 of the TCU 110 may receive caravan messages 126 from other vehicles 102. In an example, the vehicles 102 may use V2V communication and/or user input to communicate various capability information 204 about themselves to one another. The capability information 204 may define aspects of the capabilities of the vehicle 102 for traversing obstacles 206 along the route 118. The capability information 204 may include information such as model year, brand, model, trim, aftermarket parts for each vehicle 102. This capability information 204 may also include data such as their relative specifications, e.g., maximum water depth, maximum suspension travel, etc., such that each vehicle 102 is aware of the relative limits of one another.

In some examples, the capability information 204 may additionally include capabilities of the driver instead of or in addition to the capabilities of the vehicle 102 itself. For example, if the vehicle 102 is being driven by a less experienced driver, specifications may be set that are below the limitations of the vehicle 102 to allow less-experienced driver to traverse the route 118 within the driver's capabilities in addition to within the capability information 204 of the vehicle 102.

The notification application 124 may also have access to a route 118 to be traversed by the caravan 120. In an example, the route 118 may refer to a way or course taken by a vehicle 102 from an origin location to a destination location. In some examples, the routes 118 may be defined off-road courses along various trails. In other examples, the route 118 may be defined by the caravan 120, such as via a proposed path suggested by one of the vehicles 102 of the caravan 120 as provided to the other vehicle 102 on the caravan vehicle list 128 via caravan messages 126.

One or more obstacles 206 may be located along the route 118. The obstacles 206 may refer to geofenced areas along the route 118 that may require specific vehicle 102 settings or actions to traverse. Examples of obstacles 206 may include water, rocks, narrowing of the path, dirt, sand, mud, etc., along the route 118. Thus each obstacle 206 may be represented by data including a type of the obstacle 206 and a geofence indicating the location of the obstacle 206.

In some examples, the route 118 may include information defining the obstacles 206 along the route 118. In other examples, precompiled data may be used to identify the obstacles 206. This may include for example, accessing terrain map data to determine the locations of the obstacles 206. In another example, the obstacles 206 may be identified using data from sensors 106 of vehicles 102 having previously traversed the route 118. This may also include data from drones, air surveys, or other sources of sensor 106 data. In other examples, the obstacles 206 may be identified via user input. In still other examples, the obstacles 206 may be identified in transit, as the vehicles 102 of the caravan 120 traverse the route 118.

Using the obstacles 206 along the route 118 and the capability information 204, the vehicle 102 may determine performance rankings 208 of the vehicles 102. The performance rankings 208 may indicate the relative capabilities of the vehicles 102 per type of obstacle 206. This determination of the performance rankings 208 may be based on the capability information 204 included in the received caravan messages 126.

In an example, the manager vehicle 102 may define performance rankings 208 for each vehicle 102 on the caravan vehicle list 128 for the traversal of each of various types of obstacles 206. The performance rankings 208 of capabilities for each vehicle 102 can be determined via user input, expert input, or a machine learning algorithm that rates capability based on specifications of the vehicle 102 (e.g., types of shocks, maximum suspension travel, presence or absence of hood scoop, etc.), or based on historical and/or previous assessments for similar routes 118. For instance, for a water obstacle 206, a vehicle 102 with a hood scoop may receive a higher relative score than a vehicle 102 without such a hood scoop. These performance rankings 208 may be defined for water fording, rock climbing, jumping, traversal of dirt surfaces, traversal of sand, traversal of muddy surfaces, etc., for whatever obstacles 206 are defined along the route 118.

Using the performance rankings 208, the manager vehicle 102 may utilize one or more ordering strategies 210 to define the vehicle ordering 202. This vehicle ordering 202 may be based on the relative performance rankings 208 of the vehicles 102 and the determined obstacles 206. Different ordering strategies 210 may be used based on the expected obstacles 206 along the driving path.

For a general off-roading route 118 with a minimum of obstacles 206 (e.g., minimal water fording and/or rock climbing), the least capable vehicle 102 may be assigned to be the lead vehicle 102. This least-capable first ordering strategy 210 may be used because the rest of the vehicles 102 of the caravan 120 should be at least as capable as the lead vehicle 102, and there is no specific information that requires scouting by a more capable vehicle 102 of the caravan 120. Additionally, in the least-capable first ordering strategy 210 if the lead vehicle 102 encounters an issue, the more capable vehicles 102 are available to help the lead vehicle 102.

In other cases, sending the most capable vehicle 102 first is a better ordering strategy 210. This may be accomplished to assess obstacles 206 along the route 118, sending the most equipped vehicle 102 as a scout. Thus, if obstacles 206 are indicated, a most-capable first ordering strategy 210 may be utilized.

For instance, if water fording is involved, a most water-capable first ordering strategy 210 may be employed. Using this ordering strategy 210, a vehicle 102 equipped with a snorkel may be used to traverse the water crossing first. Here, sensors 106 such as cameras, radar, lidar, etc. may be used to determine water depth and/or decide if other vehicles 102 which are not equipped with a snorkel are capable of traversing the water crossing. This allows a vehicle 102 of the caravan 120 that is most capable of handling the water to be able to inform whether the remaining vehicles 102 are able to traverse the route 118. If a snorkel equipped vehicle 102 is unavailable, water fording capability, ride height, and/or height of components such as the air intake may be compared across the vehicles 102 of the caravan 120 to order the most capable vehicles 102 to go first.

In another example where obstacles 206 are indicated, if vertical inputs are involved, which may be the case based on the obstacles 206 of the route 118, vehicles 102 with more suspension travel or more sophisticated shock absorbing capabilities may be used as lead vehicles 102. Thus, in this situation a best suspension travel first ordering strategy 210 may be employed. As less suspension articulation may lead to lower speed, vehicles 102 with lower suspension performance rankings 208 may be alerted before traversing a portion of the route 118 with vertical obstacles 206, and/or a reduced speed threshold may be recommended for such vehicles 102 over the caravan messages 126.

In yet another example, if a narrowing obstacle 206 is determined along the route 118, a smallest vehicle 102 may be chosen as the lead vehicle 102 using the performance rankings 208. In such a case, the larger vehicles 102 may be held back while smaller vehicles 102 proceed. The sensors 106 of the smaller vehicles 102 may therefore be used to determine maximum clearance to inform whether larger vehicles 102 will be able to traverse the trail before the larger vehicle 102 attempts to traverse the obstacle 206.

Figure 3:
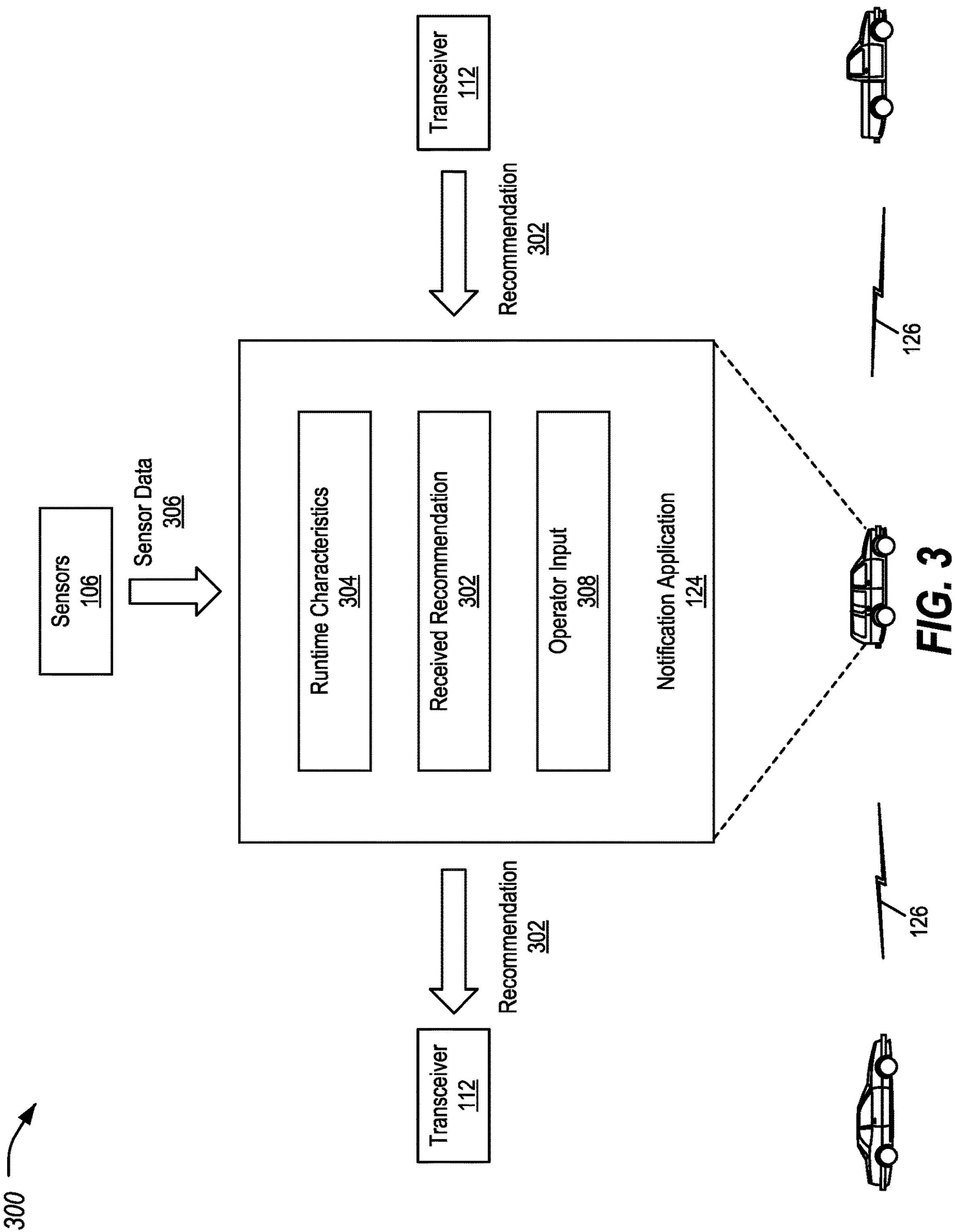
FIG. 3 illustrates an example data flow for the sending of recommendations from leading vehicles to following vehicles, in accordance with the vehicle ordering.

FIG. 3 illustrates an example data flow 300 for the sending of recommendations 302 from leading vehicles 102 to following vehicles 102, in accordance with the vehicle ordering 202. The recommendations 302 may include suggestion settings, maneuvers, operations, commands, etc. that are defined to enhance the traversal of the obstacle 206 by the following vehicle 102. For instance, the recommendations 302 may indicate speed, heading, or other suggested parameters to be used to control the following vehicle 102 for a geofenced area along the route 118. In an example, the recommendation 302 may be displayed to the HMI of the vehicle 102. In another example, the recommendation 302 may include one or more settings that may be applied to the vehicle 102 automatically, as the vehicle 102 enters a geofenced area of the obstacle 206.

The recommendations 302 may be computed based on runtime characteristics 304 of the vehicles 102 of the caravan 120. The runtime characteristics 304 may include various types of information gleaned from sensor data 306 captured from the sensors 106 of the vehicle 102. This may include the runtime characteristics 304 of the ego vehicle 102 providing the recommendation 302. The recommendations 302 may further take into account recommendations 302 received from the vehicle 102 (or vehicles 102) ahead of the ego vehicle 102 in the vehicle ordering 202. In some cases, the recommendations 302 may include operator input 308 as well, such as the steering, changes in speed, and/or spoken audio provided by the operator of the ego vehicle 102.

As some examples, the runtime characteristic 304 may include size thresholds of terrain that is being traversed by the vehicle 102. These sizes may be measured, for example, using Radar, Lidar, and/or camera sensors 106 of the vehicle 102. As some other examples, the runtime characteristics 304 may include values for wheel slip, yaw rate, yaw rate error, lateral change in speed, horizontal change in speed, vertical change in speed, presence of jerk movements in the vehicle 102 travel, etc., may be gathered from the vehicle controllers 104. In another example, the runtime characteristics 304 may include estimated surface u may be determined, e.g., via the powertrain controller 104A. In still another example, the runtime characteristics 304 may include audio data from a microphone sensor 106 may be captured and/or analyzed to determine audible characteristics of the route 118. As yet more examples, the runtime characteristics 304 may include information indicative of whether one or more wheels of the vehicles 102 have left the ground during travel, water level and/or wading depth information, and size of narrowing may also be captured as assigned to its determined allocation along the route 118.

The runtime characteristics 304 may also be correlated with GNSS location determined by the GNSS controller 104F of the sending vehicle 102 to assign the runtime characteristics 304 to the location of the specific vehicle 102 along the route 118. This may allow the runtime characteristics 304 to be associated with the locations of the obstacles 206 along the route 118.

The runtime characteristics 304 may be collected and send in caravan messages 126 broadcast from the vehicles 102. Thus, the one or more vehicles 102 may broadcast the runtime characteristics 304 as the respective vehicles 102 traverse the route 118.

The recommendations 302 may include suggestions for the following vehicle 102 to one or more of slow down, speed up, utilize autonomous driving for a portion of the route 118, increase following distance, or take a different alternate path to ensure each vehicle 102 is able to stay within capabilities and complete the route 118.

In an example, if the lead vehicle 102 experiences wheel slip above a maximum threshold based on the runtime characteristics 304, the lead vehicle 102 may send a recommendation 302 for the next vehicle 102 to use less wheel torque (e.g., proportional to weight of the following vehicle 102) while navigating a speed change. In another example, if the lead vehicle 102 has an adaptive suspension (e.g., adjustable shocks) or tire system (to reduce and/or increase tire pressure), the recommendations 302 may include modifying these systems to help the vehicle 102 navigate the route with enhanced capabilities. In yet another example, the lead vehicle 102 may send a recommendation 302 indicating a maximum speed based on suspension travel of the vehicle 102. In still another example, the lead vehicle 102 may send a recommendation 302 for wheel speed controls and/or maximum torque controls. The recommendation 302 may include slip control thresholds that may be set either manage tread lightly responsible off-road environmental controls or to reduce the changes of an approach to an obstacle 206 with too much rotational wheel end inertia.

For autonomous or semi-autonomous operations, the recommendation 302 may include parameters to inform the operation of the autonomous or semi-autonomous systems of the following vehicle 102. For instance, in one example the lead vehicle 102 may be driven, and may provide speed, direction, or other information to inform an autonomous or semi-autonomous following vehicle 102. This information may, for example, be a recording of the manual inputs received to the lead vehicle 102. For instance, the lead vehicle 102 may provide a recommendation 302 to trail control feature of the following vehicle 102 to set or limit vehicle 102 speed for an obstacle 206. In addition the recommendation 302 may include steering and/or direction control instructions to further guide the following vehicle 102.

Further, modifications to the recommendations 302 may be performed based on relative driver capability such that less experienced drivers may use specifications that are below the limitations of the vehicle 102 as to allow the driver to traverse the route 118 within the driver's capabilities in addition to within the capability information 204 of the vehicle 102.

It should be noted that the recommendations 302 may be iterative, and successive recommendations 302 may be refined based on recommendations 302 from upstream vehicles 102 along the caravan 120 in view of the runtime characteristics 304.

For example, refinements to the upstream recommendation 302 may include adjustments in the route 118 itself, e.g., to maneuver around an obstacle 206 where the runtime characteristic 304 detect a better path. Or, if a more capable lead vehicle 102 recognizes a path that is likely not capable for another vehicle 102 in the caravan 120 based on the capability information 204, then an alternate path can be recommended in this situation as well.

In another example, the refinements may include reductions or increases in speed. For instance, if suspension travel recorded by the vehicle 102 results in high rates of change in speed at the ends of suspension travel, a reduction in speed may be required. Or, if traversing through sand or mud or another surface which requires inertial management is resulting in a very low speed of the vehicle 102 with a high wheel speed, an increase in speed of the vehicle 102 prior to this occurrence may be recommended.

In yet another example, the refinements may include chassis controls. For instance, an increased ride height may be specified in the recommendation 302 if sounds or changes in speed associated with ground contact are observed. If so, the vehicle 102 may consider increasing ride height of the vehicle 102 if available, e.g., by adjusting air suspension settings.

In still another example, the refinements may include increased shock damping. In some examples, the vehicle 102 may be equipped with electronically controlled position sensitive shock absorbers. In the event high rates of change in speed are seen at the ends of wheel travel on a lead vehicle 102, the lead vehicles 102 may include, in a recommendation 302, shock absorber control when traversing a geofenced area where the shock as detected to reduce wheel end changes in speed.

In yet another example, the refinements may include jump mode settings. For instance, if the lead vehicle 102 implements a jump mode and a jump is detected, the following vehicles 102 may be instructed to restricted speed if the following vehicle 102 lacks the capability to jump. Or, the following vehicle 102 may be advised that a jump condition may occur. As another possibility, recommended settings of the following vehicle 102 may be preemptively adjusted by the recommendation 302 when the following vehicle 102 enters a geofenced area specified by the recommendation 302 of coordinates of the jump to provide advantageous chassis settings for the expected jump.

In another examples, the refinements may include stability control settings. For instance, if the lead vehicle 102 identifies a stop event in the runtime characteristics 304, the lead vehicle 102 may include, in the recommendation 302, to precharge the stopping system to reduce response time in places where quick reductions in speed response may be desired. In another example, stability control thresholds may be optimized, such as opening yaw error thresholds to allow for additional rotation to increase a fun factor, tightening stability control thresholds on tight trails where sliding may result in contact with edges of trail or with other objects.

In an additional aspect, the recommendations 302 may include audio from a lead vehicle 102 played in a following vehicle 102. This audio may be recorded by the lead vehicle 102 of the lead driver explaining how to proceed, where these instructions may then be provided along the caravan 120 to be heard by less experienced drivers. Moreover, this audio may be geofenced to the obstacles 206 being discussed based on GNSS position of vehicle 102, such that the audio may be provided in the HMI of the following vehicle 102 as the following vehicle 102 approaches the obstacle 206. A lead time for playing back the audio may be configurable such that the driver may can receive the message in advance of the obstacle 206 or while traversing the obstacle 206. In some examples, this phase lead time may be adjusted based on speed of the vehicle 102 such that low speed obstacles 206 may be explained during traversal, as compared to higher speed obstacles 206 which may be explained in advance of the vehicle 102 interaction with the obstacle 206.

Figure 4:
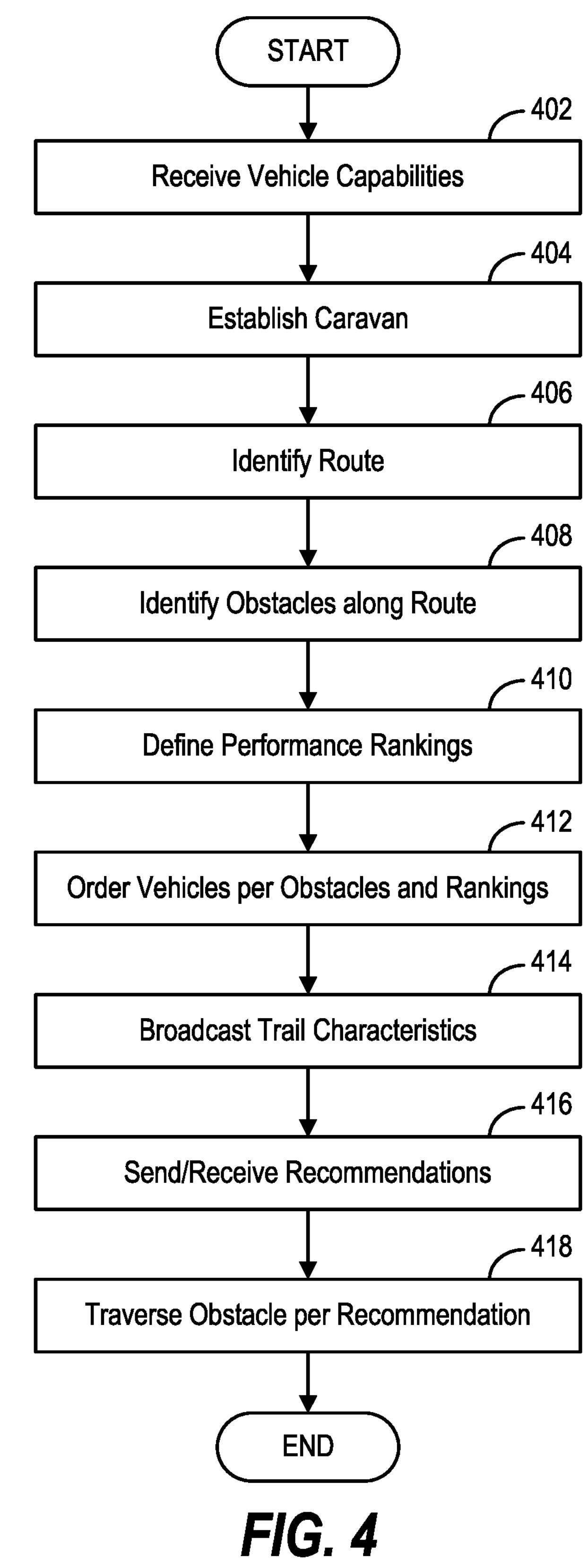
FIG. 4 illustrates an example process for the operation of a vehicle route feedback and control system.

FIG. 4 illustrates an example process 400 for the operation of a vehicle route feedback and control system 100. In an example, the process 400 may be performed collectively by a plurality of vehicles 102 managing the caravan 120.

At operation 402, the one or more vehicles 102 receive capability information 204 of the other vehicles 102. The capability information 204 may include information with respect to the abilities of the vehicles 102 and/or driver of the vehicle 102 to traverse various types of obstacles 206. The capability information 204 may be sent from vehicles 102 in caravan messages 126 and received by other vehicles 102 using the wireless transceivers 112.

At operation 404, the one or more vehicles 102 establish a caravan 120 based on the capability information 204. In an example, the vehicles 102 transmitting and receiving the caravan messages 126 may add identifiers of one another to a caravan vehicle list 128 maintained by each vehicle 102. In another example, one of the vehicles 102 may establish as the manager of the caravan 120 and may compile the caravan vehicle list 128 based on the caravan message 126 received to the manager vehicle 102.

At operation 406, the one or more vehicles 102 identify a route 118 for travel of the caravan 120. In an example, the route 118 may refer to a way or course taken by a vehicle 102 from an origin location to a destination location. In some examples, the routes 118 may be defined off-road courses along various trails. In other examples, the route 118 may be defined by the caravan 120, such as via a proposed path suggested by one of the vehicles 102 of the caravan 120 as provided to the other vehicle 102 on the caravan vehicle list 128 via caravan messages 126.

At operation 408, the one or more vehicles 102 identify obstacles 206 along the route 118. In some examples, the route 118 may include information defining the obstacles 206 along the route 118. In other examples, precompiled data may be used to identify the obstacles 206. This may include for example, accessing terrain map data to determine the locations of the obstacles 206. In another example, the obstacles 206 may be identified using data from sensors 106 of vehicles 102 having previously traversed the route 118. This may also include data from drones, air surveys, or other sources of sensor 106 data. In other examples, the obstacles 206 may be identified via user input. In still other examples, the obstacles 206 may be identified in transit, as the vehicles 102 of the caravan 120 traverse the route 118.

At operation 410, the one or more vehicles 102 define performance rankings 208 for each vehicle 102. In an example, the performance rankings 208 of capabilities for each vehicle 102 may be determined via user input, expert input, or a machine learning algorithm that rates capability based on specifications of the vehicle 102 (e.g., types of shocks, maximum suspension travel, presence or absence of hood scoop, etc.), or based on historical and/or previous assessments for similar routes 118. Further aspects of the determining of the performance ranking 208 are discussed herein with respect to FIG. 2.

At operation 412, the one or more vehicles 102 orders the vehicles 102 of the caravan 120. Based on the obstacles 206 identified at operation 410, and the performance rankings 208 of the vehicles 102 defined at operation 406, the vehicles 102 may determine a vehicle ordering 202 of the vehicles 102 for a caravan 120. This vehicle ordering 202 may be based on the relative performance rankings 208 of the vehicles 102 and the determined obstacles 206. Different ordering strategies 210 may be used based on the expected obstacles 206 along the driving path. Further aspects of the determining of the vehicle ordering 202 are discussed herein with respect to FIG. 2.

At operation 414, the one or more vehicles 102 broadcasts runtime characteristics 304 as vehicles 102 traverse the route 118. The runtime characteristics 304 may be correlated with GNSS location determined by the GNSS controller 104F to assign the runtime characteristics 304 to the location of the vehicle 102 along the route 118. These runtime characteristics 304 may be collected and send in caravan messages 126 broadcast from the vehicles 102. Further aspects of the broadcasting of the runtime characteristics 304 are discussed herein with respect to FIG. 3.

At operation 416, the one or more vehicles 102 send and receive recommendations 302 based on the runtime characteristics 304 to following vehicles 102. As noted herein, the caravan vehicle list 128 may define an ordering of the vehicles 102 as determined at operation 412. In an example, each vehicle 102 may be responsible for receiving recommendations 302 from the vehicle 102 ahead of it in the ordering, and for sending recommendations 302 to the vehicle 102 behind it in the ordering. This may accordingly all each vehicle 102 traversing the route 118 to provide refinements, if required, of the instructions provided by the lead vehicle 102. Further aspects of the sending and receiving of the recommendation 302 are discussed herein with respect to FIG. 3.

At operation 418, the one or more vehicles 102 traverse the obstacles 206 in accordance with the received recommendations 302. In an example, the one or more vehicles 102 adjust vehicle settings and/or perform vehicle operations using the controllers 104 in accordance with the recommendations 302. In an example, the recommendations 302 may suggest for the following vehicle 102 to one or more of slow down, speed up, utilize autonomous driving for a portion of the route 118, increase following distance, or take a different alternate path to ensure each vehicle 102 is able to stay within capabilities and complete the route 118. For instance, a more capable vehicle 102 recognizes a path that is likely not capable for another vehicle 102 in the caravan 120 based on the capability information 204, then an alternate path can be recommended instead. Accordingly, the following vehicles 102 may receive helpful information about how to traverse the obstacles 206 of the routes 118 based on the information captured by the leading vehicles 102. After operation 418, the process 400 ends.

Variations on the process 400 are possible. For example, the order of vehicles 102 may be changed during the route 118 to allow certain vehicles 102 to take lead in specific areas that are more aligned with their strengths and/or capabilities. For instance, the reordering may be performed before each obstacle 206, e.g., in best to least capability to traverse the obstacle 206, such that the vehicle 102 best suited for that next obstacle 206 is reordered to traverse the obstacle 206 first.

In a specific example, a first obstacle 206 may be a water obstacle 206. A first ordering of the vehicles 102 may be performed using a first ordering strategy 210, e.g., in order from the most capable vehicle 102 for traversing water to the least capable vehicle 102 for traversing water. The performance rankings 208 used to create the vehicle ordering 202 may be defined by the runtime characteristics 304 as noted above. After traversing the first obstacle 206, the vehicles 102 may next encounter a second obstacle 206. The second obstacle 206 may be a mud obstacle 206. A second ordering of the vehicles 102 may similarly be performed again using the first ordering strategy 210, e.g., in order from the most capable vehicle 102 for traversing mud to the least capable vehicle 102 for traversing mud. This may allow the most suited vehicle 102 for each obstacle 206 to traverse the obstacle 206 first.

In another specific example, a first obstacle 206 may be a rock obstacle 206. A first ordering of the vehicles 102 may be performed using a first ordering strategy 210, e.g., in order from the most capable vehicle 102 for traversing rocks to the least capable vehicle 102 for traversing water. This may allow the most suited vehicle 102 for the rock obstacle 206 to identify any specifics that may be useful for following vehicles 102 with more limited suspension travel or other more limited capabilities as specified by the capability information 204. After traversing the first obstacle 206, the vehicles 102 may next encounter a second obstacle 206. The second obstacle 206 may be a mud obstacle 206. A second ordering of the vehicles 102 may be performed using a second ordering strategy 210, e.g., in order from the least capable vehicle 102 for traversing mud to the most capable vehicle 102 for traversing mud. The least-capable first ordering strategy 210 may be used because the rest of the vehicles 102 of the caravan 120 should be at least as capable as the lead vehicle 102, and for the particular mud obstacle 206 there may be no specific information that requires scouting by a more capable vehicle 102 of the caravan 120.

In some examples, the transition between the first and second vehicle orderings 202 may be performed responsive to the last of the vehicles 102 of the caravan 120 having traversed the first obstacle 206 and/or before the first vehicle 102 has traversed the second obstacle 206. In another example, the transition between the vehicle orderings 202 may be performed at a predefined location, such as a clearing or other location defined along the route 118 as having space to allow for the vehicles 102 to be reordered. In some examples, an indication to perform the reordering may be presented the HMI of the vehicles 102. This may allow for the respective vehicles 102 to receive operator input to reorder. Or, in autonomous or semi-autonomous examples, the reordering may be performed autonomously or semi-autonomously, with or without notification via the HMI.

It should be noted that in some instances, there may not be a location between first and second obstacles 206 that allows for the reordering to take place. In such a situation, the ordering of the caravan 120 may be performed using an ordering strategy 210 suited to the traversal of multiple obstacles 206. For instance, if it is determined that scouting is required for the second obstacle 206 but not for the first obstacle 206, then the vehicles 102 may be placed into a vehicle ordering 202 for the second obstacle 206 before traversing the first and second obstacles 206. Or if it is determined that a first capability (e.g., suspension travel) is desired for the first obstacle 206, and a second capability (e.g., water depth) is desired for the second obstacle 206, then a combined best-to-least vehicle ordering 202 using both of these capabilities. This may be computing by determining performance rankings 208 as a combination of the capabilities specified by the capability information 204. In such a combined ordering, the capabilities for the combined ordering may be weighted. In a simple example this may be an equal weighting of the capability desired for traversal of the first obstacle 206 and the capability desired for traversal of the second obstacle 206. Or, to compute the performance rankings 208, the capabilities may be weighted according to a relative importance. This relative importance may be received via the HMI, may be defined in user settings, may be an importance defined by the types of the obstacles 206, etc.

It should also be noted that, in some cases, multiple capabilities may be desired for a single obstacle 206. For instance, an obstacle 206 may include both a narrowing and also water. In such a situation, a vehicle ordering 202 may similarly be computed as a combination of capabilities.

As another variation, alternate routes 118 may be indicated. For example, there may be points along the route 118 where backing up or where a less challenging bypass is available. These can be noted so that vehicles 102 of the caravan 120 may be informed when they have reached a point of no return where the vehicle 102 may be required to complete traversal of the obstacle 206 and cannot return backward.

As a further variation, the process 400 may be used for the further purpose of determining if trail erosion along the route 118 is excessive or increasing. If so, recommendations 302 may be made to reduce the trail erosion. For instance, the sensors 106 may be used to capture sensor data 306 indicative of the state of the terrain, including the obstacles 206 as well as other areas of the routes 118 that are free of obstacles 206. A front camera sensor 106 of the vehicle 102 may be used to record a view of the terrain before traversal by the vehicle 102. A rear camera sensor 106 of the vehicle 102 may be used to record a view of the terrain after traversal by the vehicle 102. This data may be captured by a plurality of vehicles 102 of the caravan 120 and may be indexed in time according to the vehicle ordering 202 of the caravan 120. Using the sequence of images, an overall analysis of the change in the terrain (e.g., based on the telemetry information captured by the caravan 120), the vehicles 102 may determine whether changes to the terrain are consistent with responsible usage of the trails. Or, if trail erosion is excessive, alternative routes route 118 may be recommended to be consistent with responsibly treading lightly.

In another example, GNSS location relative to wheel speeds may be utilized to determine whether excessive trail erosion is being caused. Relative wheels speeds for vehicles 102 as compared to distance traveled may be compared over time, such that where relative wheel speeds are shown as increasing vs. GNSS speed, the vehicle 102 may provide recommendations 302 that excessive trail erosion may be taking place due to wheel spin. If so, alternative routes route 118 may be recommended to be consistent with responsibly treading lightly.

Figure 5:
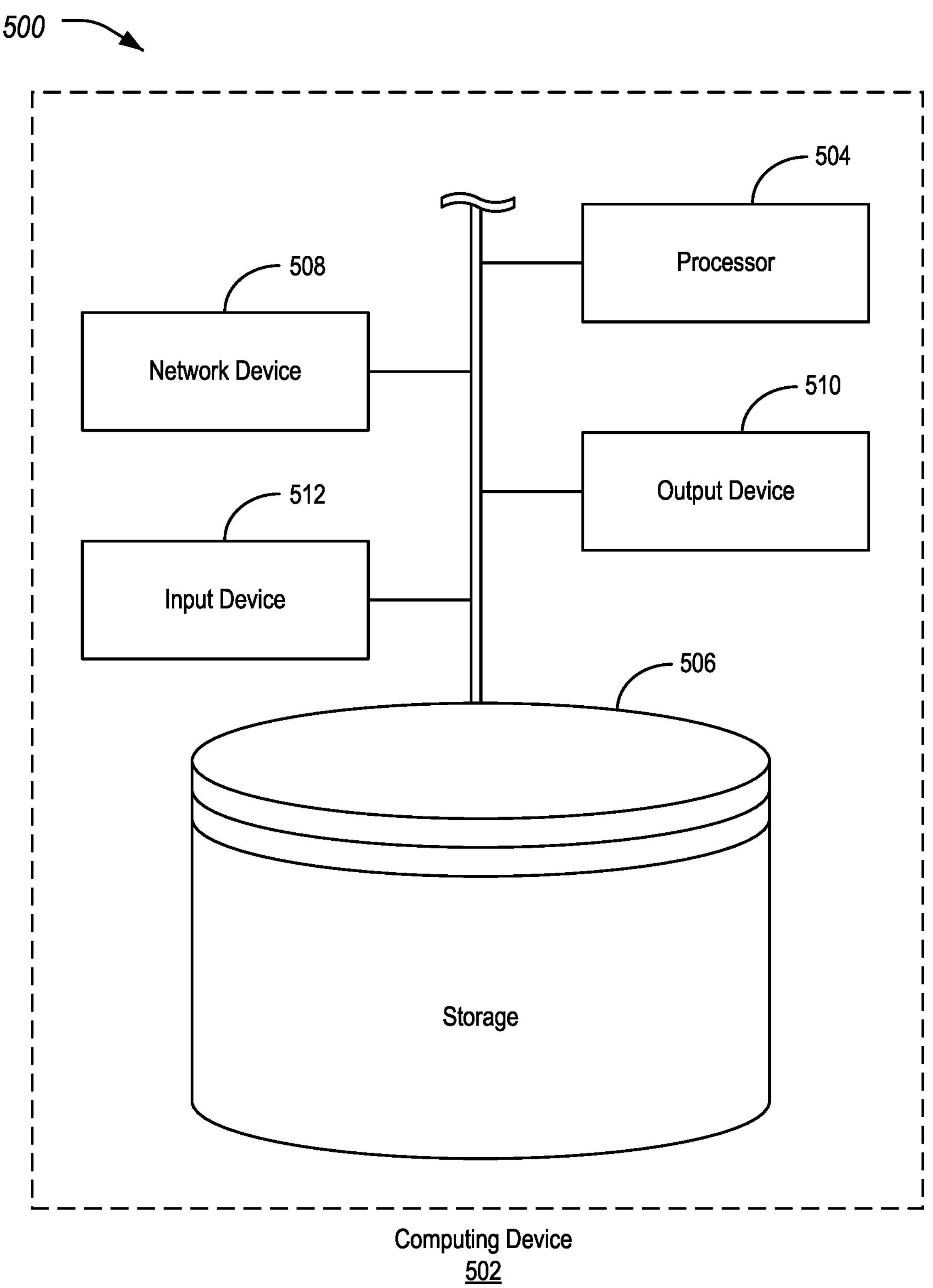
FIG. 5 illustrates an example of a computing device for use in vehicle route feedback and control system for vehicle caravans.

FIG. 5 illustrates an example 500 of a computing device 502 for use in route feedback and control system 100 for vehicle caravans 120. Referring to FIG. 5, and with reference to FIGS. 1-4, the vehicles 102, controllers 104 and TCU 110 may be examples of such computing devices 502. As shown, the computing device 502 includes a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 504 executes stored program instructions that are retrieved from the storage 506, such as those of the notification application 124. The stored program instructions accordingly include software that controls the operation of the processors 504 to perform the operations described herein. The storage 506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the control system 100. Examples of data stored to the storage 506 may include the route 118, caravan vehicle list 128, vehicle ordering 202, capability information 204, information about the obstacles 206, performance rankings 208, ordering strategies 210, recommendations 302, runtime characteristics 304, sensor data 306, and operator input 308.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the vehicles 102 to send and/or receive data from external devices over networks. Examples of suitable network devices 508 include an Ethernet interface, a Wi-Fi transceiver, a cellular transceiver, or a BLUETOOTH or Bluetooth Low Energy (BLE) transceiver, an ultra wideband (UWB) transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An ego vehicle of a caravan of a plurality of vehicles, comprising:

a wireless transceiver;

a plurality of sensors; and one or more controllers, configured to:

receive, in caravan messages via the wireless transceiver, capability information indicative of capabilities of the plurality of vehicles to traverse obstacles along a route, determine performance rankings indicative of relative capabilities of the plurality of vehicles to traverse obstacles per type of obstacle based on the capability information, utilize one or more ordering strategies to define a first vehicle ordering for traversal of a first obstacle along the route, the first vehicle ordering being based on the performance rankings of the plurality of vehicles and the first obstacle, traverse the first obstacle, by the caravan, according to the first vehicle ordering, utilize the one or more ordering strategies to define a second vehicle ordering for traversal of a second obstacle along the route, the second vehicle ordering being based on the performance rankings of the vehicles and a type of the second obstacle, wherein the second obstacle is of a different type than the first obstacle, and the second vehicle ordering differs from that of the first vehicle ordering, and traverse the second obstacle, by the caravan, according to the second vehicle ordering.

2. The ego vehicle of claim 1, wherein the one or more controllers are further configured to:

identify a location between the first obstacle and the second obstacle at which to reorder the plurality of vehicles; and reorder the plurality of vehicles from the first vehicle ordering to the second vehicle ordering at the identified location.

3. The ego vehicle of claim 1, wherein the one or more ordering strategies include a least-capable first ordering strategy in which the plurality of vehicles are ordered in increasing order of capability to send a least equipped vehicle first to retain more equipped vehicles should the least equipped vehicle require assistance.

4. The ego vehicle of claim 1, wherein the one or more ordering strategies include a most-capable first ordering strategy in which the plurality of vehicles are ordered in decreasing order of capability for traversing the type of obstacle to send a most equipped vehicle first.

5. The ego vehicle of claim 1, wherein the one or more controllers are further configured to:

receive, using the wireless transceiver, a first recommendation from a leading vehicle of the plurality of vehicles earlier in the ordering than the ego vehicle, receive, from the plurality of sensors, runtime characteristics of the ego vehicle, create a second recommendation to a following vehicle of the caravan behind the ego vehicle in the ordering, based on the first recommendation and the runtime characteristics, and send the second recommendation to the following vehicle using the wireless transceiver.

6. The ego vehicle of claim 5, wherein the second recommendation includes spoken audio provided by an operator of the ego vehicle traversing the obstacle, to be provided to an operator of the following vehicle responsive to the following vehicle traversing the obstacle.

7. The ego vehicle of claim 5, wherein the first recommendation includes a setting for one or more of vehicle speed, shock dampening settings, jump mode settings, stability control settings, and/or wheel torque limit settings, and the second recommendation includes a refinement to the setting according to the runtime characteristics of the ego vehicle received from the plurality of sensors of the ego vehicle.

8. The ego vehicle of claim 7, wherein the setting from the second recommendation is automatically applied to the following vehicle without operator input.

9. A method for performing a caravan of a plurality of vehicles by an ego vehicle, comprising:

receiving, in caravan messages via a wireless transceiver of the ego vehicle, capability information indicative of capabilities of the plurality of vehicles to traverse obstacles along a route;

determining performance rankings indicative of relative capabilities of the plurality of vehicles to traverse obstacles per type of obstacle based on the capability information;

utilizing one or more ordering strategies to define a first vehicle ordering for traversal of a first obstacle along the route, the first vehicle ordering being based on the performance rankings of the plurality of vehicles and the first obstacle;

traversing the first obstacle, by the caravan, according to the first vehicle ordering;

utilizing the one or more ordering strategies to define a second vehicle ordering for traversal of a second obstacle along the route, the second vehicle ordering being based on the performance rankings of the plurality of vehicles and the second obstacle, wherein the second obstacle is of a different type than the first obstacle, and the second vehicle ordering differs from that of the first vehicle ordering; and traversing the second obstacle, by the caravan, according to the second vehicle ordering.

10. The method of claim 9, further comprising:

identifying a location between the first obstacle and the second obstacle at which to reorder the plurality of vehicles; and reordering the plurality of vehicles from the first vehicle ordering to the second vehicle ordering at the identified location.

11. The method of claim 9, wherein the one or more ordering strategies include a least-capable first ordering strategy in which the plurality of vehicles are ordered in increasing order of capability to send a least equipped vehicle first to retain more equipped vehicles should the least equipped vehicle require assistance.

12. The method of claim 9, wherein the one or more ordering strategies include a most-capable first ordering strategy in which the plurality of vehicles are ordered in decreasing order of capability for traversing the type of obstacle to send a most equipped vehicle first.

13. The method of claim 9, further comprising:

receiving, using the wireless transceiver, a first recommendation from a leading vehicle of the plurality of vehicles earlier in the ordering than the ego vehicle;

receiving, from a plurality of sensors of the ego vehicle, runtime characteristics of the ego vehicle;

creating a second recommendation to a following vehicle of the caravan behind the ego vehicle in the ordering, based on the first recommendation and the runtime characteristics; and sending the second recommendation to the following vehicle using the wireless transceiver.

14. The method of claim 13, wherein the second recommendation includes spoken audio provided by an operator of the ego vehicle traversing the obstacle, to be provided to an operator of the following vehicle responsive to the following vehicle traversing the obstacle.

15. The method of claim 14, wherein the first recommendation includes a setting for one or more of vehicle speed, shock dampening settings, jump mode settings, stability control settings, and/or wheel torque limit settings, and the second recommendation includes a refinement to the setting according to the runtime characteristics of the ego vehicle received from the plurality of sensors of the ego vehicle.

16. The method of claim 15, wherein the setting from the second recommendation is automatically applied to the following vehicle without operator input.

17. A non-transitory computer readable medium comprising instructions that, when executed by one or more controllers of an ego vehicle of a caravan of vehicles, cause the ego vehicle to perform operations including to receive, in caravan messages via a wireless transceiver of the ego vehicle, capability information indicative of capabilities of the caravan of vehicles to traverse a first obstacle along a route;

determine performance rankings indicative of relative capabilities of the caravan of vehicles to traverse obstacles per type of obstacle based on the capability information;

utilize one or more ordering strategies to define a first vehicle ordering for traversal of the first obstacle along the route, the first vehicle ordering being based on the performance rankings of the caravan of vehicles and the first obstacle;

traverse the first obstacle, by the caravan, according to the first vehicle ordering;

utilize the one or more ordering strategies to define a second vehicle ordering for traversal of a second obstacle along the route, the second vehicle ordering being based on the performance rankings of the caravan of vehicles and the second obstacle, wherein the second obstacle is of a different type than the first obstacle, and the second vehicle ordering differs from that of the first vehicle ordering; and traverse the second obstacle, by the caravan, according to the second vehicle ordering.

18. The non-transitory computer readable medium of claim 17, wherein the one or more ordering strategies include:

a least-capable first ordering strategy in which the caravan of vehicles are ordered in increasing order of capability to send a least equipped vehicle first to retain more equipped vehicles should the least equipped vehicle require assistance; and a most-capable first ordering strategy in which the caravan of vehicles are ordered in decreasing order of capability for traversing the type of obstacle to send a most equipped vehicle first.

19. The non-transitory computer readable medium of claim 17, further comprising instructions that, when executed by the one or more controllers, cause the ego vehicle to perform operations including to:

receive, using the wireless transceiver, a first recommendation from a leading vehicle of the caravan of vehicles earlier in the first or second ordering than the ego vehicle;

receive, from a plurality of sensors of the ego vehicle, runtime characteristics of the ego vehicle;

create a second recommendation to a following vehicle of the caravan behind the ego vehicle in the first or second ordering, based on the first recommendation and the runtime characteristics; and send the second recommendation to the following vehicle using the wireless transceiver, wherein the first recommendation includes a setting for one or more of vehicle speed, shock dampening settings, jump mode settings, stability control settings, and/or wheel torque limit settings, and the second recommendation includes a refinement to the setting according to the runtime characteristics of the ego vehicle received from the plurality of sensors of the ego vehicle.

20. The non-transitory computer readable medium of claim 19, wherein the second recommendation includes spoken audio provided by an operator of the ego vehicle traversing the first obstacle, to be provided to an operator of the following vehicle responsive to the following vehicle traversing the first obstacle.

21. The ego vehicle of claim 1, wherein the one or more ordering strategies includes a most-capable first ordering strategy, and, using the most-capable first ordering strategy, the first vehicle ordering is ordered in decreasing order of capability for traversing the first obstacle and the second vehicle ordering is ordered in decreasing order of capability for traversing the second obstacle.

* * * * *